(12) United States Patent
Hagiopol et al.

(10) Patent No.: US 7,034,087 B2
(45) Date of Patent: Apr. 25, 2006

(54) ALDEHYDE SCAVENGERS FOR PREPARING TEMPORARY WET STRENGTH RESINS WITH LONGER SHELF LIFE

(75) Inventors: Cornel Hagiopol, Lilburn, GA (US); Yuping Luo, Duluth, GA (US); David F. Townsend, Loganville, GA (US); James W. Johnston, Suwanee, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 10/919,487

(22) Filed: Aug. 17, 2004

(65) Prior Publication Data
US 2006/0041085 A1    Feb. 23, 2006

(51) Int. Cl.
*C08C 19/22*    (2006.01)
*C08F 8/32*    (2006.01)

(52) U.S. Cl. .................. 525/379; 525/329.4; 525/374; 525/383

(58) Field of Classification Search ............. 525/329.4, 525/374, 379, 383; 428/504, 511
See application file for complete search history.

(56) References Cited

U.S. PATENT DOCUMENTS

| 3,556,932 A | 1/1971 | Coscia et al. |
|---|---|---|
| 3,773,612 A | 11/1973 | Avis |
| 4,060,507 A | 11/1977 | Floyd et al. |
| 4,217,425 A | 8/1980 | Ballweber et al. |
| 4,508,594 A | 4/1985 | Jansma et al. |
| 4,603,176 A | 7/1986 | Bjorkquist et al. |
| 4,605,702 A | 8/1986 | Guerro et al. |
| 4,605,718 A | 8/1986 | Jansma et al. |
| 4,785,055 A | 11/1988 | Dexter et al. |
| 4,853,431 A | 8/1989 | Miller |
| 4,954,538 A | 9/1990 | Dauplaise et al. |
| 4,966,652 A | 10/1990 | Wasser |
| 5,147,908 A | 9/1992 | Floyd et al. |
| 5,401,810 A | 3/1995 | Jansma et al. |
| 5,427,652 A | 6/1995 | Darlington et al. |
| 5,674,362 A | 10/1997 | Underwood et al. |
| 5,763,523 A | 6/1998 | Chen et al. |
| 5,763,530 A | 6/1998 | Chen et al. |
| 5,869,589 A | 2/1999 | Raynolds et al. |
| 5,883,181 A | 3/1999 | Cicchiello et al. |
| 5,914,366 A | 6/1999 | Cicchiello et al. |
| 5,951,719 A | 9/1999 | Cooper et al. |
| 6,080,804 A | 6/2000 | Davies et al. |
| 6,197,919 B1 | 3/2001 | Crisp et al. |
| 6,380,353 B1 * | 4/2002 | Rupaner et al. ............ 528/492 |
| 6,429,253 B1 | 8/2002 | Guerro et al. |
| 6,491,790 B1 | 12/2002 | Proverb et al. |

FOREIGN PATENT DOCUMENTS

WO    WO 97/30118    *    8/1997

OTHER PUBLICATIONS

U.S. Appl. No. 10/785,403, filed Feb. 25, 2004, Hagiopol et al.

* cited by examiner

*Primary Examiner*—Helen L. Pezzuto
(74) *Attorney, Agent, or Firm*—Banner & Witcoff, Ltd.

(57) ABSTRACT

Aldehyde scavengers which are adducts of choline or a choline salt and an optionally substituted acrylamide monomer can be used to stabilize glyoxalated polyacrylamide compositions and to provide supplementary cationic charges for the polymer backbone.

3 Claims, No Drawings

ALDEHYDE SCAVENGERS FOR PREPARING TEMPORARY WET STRENGTH RESINS WITH LONGER SHELF LIFE

FIELD OF THE INVENTION

The present invention relates to aldehyde scavengers which are useful for preparing temporary wet strength resins.

BACKGROUND OF THE INVENTION

There are a wide variety of wet end additives used for strengthening paper products. For instance, water-soluble polyacrylamides have been used to impart dry strength and temporary wet strength to paper products. Such polymers must have sufficient cationic character to provide an affinity to paper fibers and can be made thermosetting to improve their strength-enhancing character.

One known class of polyacrylamide strengthening agents includes materials which have been modified with glyoxal to make them thermosetting. Due to poor stability, however, the molecular weights of current glyoxalated polyacrylamides continue to increase, even at room temperature, until the polymers gel. Thus, the art continues to search for ways for producing glyoxalated polyacrylamide strengthening agents of improved stability.

DETAILED DESCRIPTION OF THE INVENTION

The present invention provides aldehyde scavengers which are useful for preparing temporary wet strength resins comprising glyoxylated polymers and copolymers of acrylamide. The stability of glyoxalated polyacrylamides depends upon a balance between the free glyoxal in the composition and the reactive pendant aldehyde and other functional groups. Aldehyde scavengers can be used reduce the reactivity of the aldehyde and other functional groups.

Aldehyde Scavengers

Aldehyde scavengers of the invention are adducts of choline or a choline salt and an acrylamide monomer and have the structure shown below:

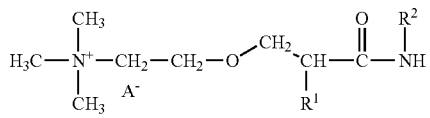

The "acrylamide monomer" is a monomer of a primary vinylamide, including not only acrylamide itself but also substituted acrylamides having the formula:

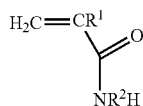

wherein $R^1$ is hydrogen or $C_{1-2}$ alkyl and $R^2$ is hydrogen or $C_1–C_4$ alkyl.

"A" is a compatible anion such as hydroxyl or any negatively charged ion which can form a salt with choline (e.g., chloride).

These aldehyde scavengers are much more efficient than scavengers which contain a hydroxyl group. In addition, aldehyde scavengers of the invention can provide supplementary cationic charges for the polymer backbone because any reaction between an aldehyde pendant group and the adduct will result in an additional cationic charge on an acrylamide polymer or copolymer.

An adduct of choline chloride and acrylamide (ethanaminium, 2-(3-amino-3-oxopropyl)-N,N,N-trimethyl-, chloride) is a particularly preferred aldehyde scavenger:

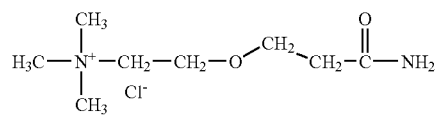

Preparation of Aldehyde Scavengers

Aldehyde scavengers of the invention are prepared by reacting choline or a choline salt with an acrylamide monomer, as shown below:

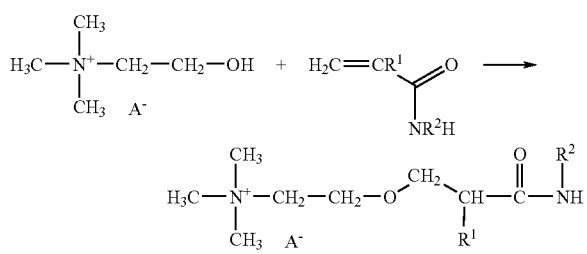

Aldehyde scavengers of the invention can be prepared, for example, through a Michael addition reaction. The Michael addition can be performed in an aqueous solution containing about 2.5% by weight sodium hydroxide at a temperature in the range of 70° to 100° C. The molar ratio between the choline or choline salt and the acrylamide monomer can be in the range of 1:1 to 1:0.5 with the solids content of the reactants between about 25 to 70 wt. %. In such reactions, the acrylamide conversion to aldehyde scavenger is higher than 95% (based on free acrylamide concentration measurements). The resultant preparation can be used without further purification.

Use of Aldehyde Scavengers to Stabilize Glyoxalated Polyacrylamides

Aldehyde scavengers of the invention can be used to stabilize glyoxalated polyacrylamides both during and after their preparation. Methods of preparing glyoxalated polyacrylamide compositions are known in the art. Generally, such methods include reacting a first portion of glyoxal with a polyacrylamide having pendant amide groups to form a glyoxalated polyacrylamide (step a); and adding an acid to the glyoxalated polyacrylamide to form an acidified glyoxalated polyacrylamide (step b). See also Avis, U.S. Pat. No. 3,773,612; Bjorkquist, U.S. Pat. No. 4,603,176; Dauplaisel, U.S. Pat. No. 4,954,538; Floyd, U.S. Pat. No. 5,147,908; and Guerro, U.S. Pat. No. 4,605,702.

Aldehyde scavengers of the invention are particularly useful for further enhancing the shelf life of "stabilized glyoxalated polyacrylamide compositions" prepared by methods in which the glyoxal is added to the base polyacrylamide polymer in two portions. In such methods, a second portion of glyoxal is added to the acidified glyoxalated polyacrylamide to form a stabilized glyoxalated polyacrylamide (step c). Glyoxalated polyacrylamides prepared according to such methods have a distribution among pendant amide groups, cross-linked glyoxal units, pendant glyoxalated groups and free glyoxal that provides an improved degree of stability to the composition. This stability can be further increased by adding one or more aldehyde scavengers of the invention to the composition in one or more of step (a), step (b), step (c), and the stabilized glyoxalated polyacrylamide. Optionally, as described below, one or more aldehyde scavengers of the invention can be added during polymerization of the base polyacrylamide composition.

Preparation of Stabilized Glyoxalated Polyacrylamide Compositions

The base polyacrylamide, which is glyoxalated in accordance with the method outlined above, can be prepared by free radical polymerization of a base acrylamide monomer in an aqueous system using a chain transfer agent, such as 2-mercaptoethanol. Methods for making polyacrylamide polymers are well known in the prior art. The term "polymer" is used throughout this specification in its conventional sense to refer to compounds having a molecular weight of about 500 to 1000 or higher. The term "monomer" is used herein to refer to compounds that are not polymeric and which can polymerize in order to generate a "polymer."

As used herein, "crosslinked" and similar terms are intended to embrace the structural and/or morphological change that occurs, for example, by covalent chemical reaction or ionic interaction between separate molecules in a composition.

Base Acrylamide Monomer

A base acrylamide monomer provides the primary reaction sites on the base polymer backbone to which the glyoxal substituents are attached. The base polymer must have a sufficient number of base acrylamide monomers in its structure (pendant amide groups) so that, once functionalized with glyoxal, the resulting polymer is thermosetting. Generally, the amount of base acrylamide monomer should be at least about 10 mole percent based on the total number of monomers used to prepare the base polyacrylamide polymer. Higher amounts are usually preferred as this has a beneficial effect on the paper strengthening properties of the resulting polymer. As a result, the base acrylamide monomer is normally provided in an amount of at least about 50 mole percent and sometimes in excess of 75 mole percent of the total number of vinyl monomers from which the base polyacrylamide is prepared.

The term "base acrylamide monomer" is intended to embrace primary vinylamides including not only acrylamide itself but also substituted acrylamides such as methacrylamide, ethylacrylamide, crotonamide, N-methyl acrylamide, N-butyl acrylamide, N-ethyl methacrylamide and the like. Thus, polyacrylamides, which by definition are polymers made from acrylamide monomers, include repeating units from at least some of these various compounds.

Cationic Co-Monomer

In addition to the base acrylamide monomer, the reaction mixture also includes a sufficient amount of an unsaturated cationic co-monomer to provide the ultimate polyacrylamide polymer with a suitable cationic character for strengthening paper. The amount of cationic components should be sufficient to render the modified polyacrylamide polymer self-substantive to cellulose fibers in aqueous suspensions. The quantity of polymer retained on the cellulose fibers can be determined by measuring the nitrogen content of the fibers both before and after treatment with the polyacrylamide composition.

Typically, a few cationic monomers, and in some case a single monomer, in each base polymer molecule may be sufficient to provide the polymer with an adequate cationic character to make the polymer substantive to cellulose fibers. A polymer with a suitable amount of cationic character thus can usually be obtained by including at least about 0.001 mole of cationic monomer and upwards of 0.25 mole and possibly more of cationic monomer, per mole of acrylamide monomer in the reaction mixture. Usually an amount between 0.01 and 0.15 mole of cationic monomer per mole of acrylamide monomer should be satisfactory, with an amount between 0.02 and 0.10 being more typical.

Suitable co-monomers for conferring a cationic character to the base polyacrylamide polymer when dissolved in water include a diallyl quaternary monomer (generally diallyl dimethyl ammonium chloride, DADMAC), 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino) ethyl acrylate, and mixtures thereof. In addition to chloride, the counterion for the cationic monomers also can be fluoride, bromide, iodide, sulfate, methylsulfate, phosphate and the like.

In order to prepare a polyacrylamide of a desired chemical composition and monomer distribution, the full complement of the cationic co-monomer(s) can be added all at once at the beginning of the polyacrylamide polymerization reaction. Alternatively, the cationic co-monomer(s) can be added continuously along with base acrylamide monomers over the time course of the polymerization reaction, or in yet another embodiment the full complement of the co-monomer(s) can be added all at once, but only after a certain conversion of base acrylamide to form a polyacrylamide homopolymer has occurred. Still other options for reacting the cationic co-monomer with the base acrylamide monomer/polyacrylamide polymer will be recognized by those skilled in the art.

Other Monomers

Other vinyl monomers that can be present during preparation of the base polyacrylamide and thus become incorporated into the base polymer include (1) diluter monomers, i.e., monomers that reduce the concentration of required monomers is each polymer but do not provide any functional site for modification of the polymer, and (2) other functional monomers, i.e., non-amide vinyl monomers that can be incorporated into the base polymer and have pendant groups that also may react with glyoxal.

Diluter monomers include, for example, acrylic esters such as ethyl acrylate, methylmethacrylate and the like, acrylonitrile, vinyl acetate, N-vinyl pyrrolidone, N,N'-dimethyl acrylamide, hydroxy alkyl (meth) acrylates, styrene and the like.

Functional monomers include, for example, allylglycidal ether, glycidyl methacrylate and the like. Of a special interest are those co-monomers with a 1,2-diol in their structure, such as 3-allyloxy-1,2-propandiol, 3-acryloyloxy-1,2-propandiol and methacryloyloxy-1,2-propandiol.

The diluter monomers can be present in the reaction mixture in an amount of up to about 0.5 mole per mole of acrylamide monomer, while the amount of functional monomers should not exceed about 0.15 mole per mole of acrylamide monomer. The amount and ratio of the diluter and functional monomers in the reaction mixture can be used as another control of the extent and distribution of glyoxalation.

Suitable base polymers, for example, can be prepared from a mixture of acrylamide and diallyldimethyl ammonium chloride in a molar ratio between 99:1 and 75:25.

In an alternative embodiment, a di-functional co-monomer can be used in order to obtain a branched polyacrylamide polymer structure. N,N'-methylene-bisacrylamide, N,N'-methylene-bismethacrylamide, N-allyl acrylamide and N-allyl methacrylamide are recommended as a di-functional co-monomers if a structure with added branching is desired.

Free Radical Polymerization

As noted above, the polyacrylamide is prepared by free radical polymerization among the base acrylamide monomers, the cationic monomers and the optional diluter, functional and di-functional monomers and is initiated using known free radical initiators. Commonly used free radical initiators that can be used include the various peroxides, tbutyl hydroperoxide, cumene hydroperoxide, benxoyl peroxide, t-butoxyperoxy hexanoate and various azo-compounds such as azodiisobutyronitrile (AIBN), azodiisobutyramidine dihydrochloride (AIBA) and dimethylazodiisobutyrate. Other useful initiators are the water-soluble compounds such as hydrogen peroxide and the sodium, potassium and ammonium persulfates used by themselves or in activated redox systems.

As well understood by those skilled in the art, the amount of initiator should be sufficient to yield an acceptable reaction rate and, in combination with the level of monomeric reactants and the chain transfer agent, as hereinbelow described, a polyacrylamide adduct of a suitable molecular weight to be water soluble. The amount of initiator, however, should not be so high as to result in an uncontrolled rate of reaction and possible gel formation. The amount of initiator used in the solution polymerization will generally be in the range of 0.01 to 3% by weight, based on the weight of the monomers, and is usually between about 0.2 and 2% by weight. The initiator can be charged at the outset of the polymerization, however, incremental addition of the initiator throughout polymerization can also be employed and may be advantageous in some circumstances. Additional amounts of initiator (introduced by itself or associated with a reducer) are used at the end of the reaction in order to consume any residual un-reacted monomers.

The polymerization proceeds nicely at a temperature broadly in the range of 30 to 100° C., more usually in the range of 60 to 90° C.

In some cases it also may be desirable to conduct the reaction in the presence of an aliphatic alcohol, such as about 4 to about 15 percent by weight of an aqueous reaction mixture of ethanol, isopropyl alcohol, n-propanol or butanol.

Chain Transfer Agent

Another constituent of the reaction system is a chain transfer agent. As understood by those skilled in the art, the chain transfer agent functions to limit or control the molecular weight of the polymer formed by the free radical polymerization reaction taking place between the monomeric reactants. Thus, a chain transfer agent preferably is used in an amount sufficient to limit the molecular weight to a desired endpoint for the specific application. The amount of the chain transfer agent should not be so high, however, that it so severely limits the molecular weight of the resulting adduct that the polymer has a poor paper strengthening property. In order to accomplish these objectives, the chain transfer agent will generally be included in the reaction mixture in the range of about 0.1 to 30% by weight, based on the weight of the monomers, and most often will be used in an amount between about 0.5 and 15% by weight. The determination of a suitable level of chain transfer agent to use in any monomer system is a matter of routine experimentation to those of ordinary skill in the art.

The chain transfer agent usually is charged into the reaction mixture at the outset of the polymerization, though it too may be added later in the reaction, or in increments if desired. Any material that is able to control/limit the extent of the polymerization via chain transfer can be used as the chain transfer agent. Suitable chain transfer agents include allyloxypropane diol, thioglycol, and mercaptans such as 2-mercaptoethanol, hydroxyethyl-3-mercaptopropionate and dodecylmercaptan. By using the chain transfer agent, one is able to limit the molecular weight of the polymerized product.

As understood by those skilled in the art, free radical solution polymerization reactions can be conducted by charging a reactor with appropriate amounts of the various monomers, the chain transfer agent and the free radical initiator. An amount of water (and an optional water miscible solvent) also is included in the reactor to provide a final solids concentration in the aqueous composition within the range of about 5 to about 50 weight percent. The solids concentration of the aqueous reaction mixture more usually is on the order of 10 to 45 weight percent.

Molecular weights of suitable base polyacrylamide polymers, before glyoxalation, typically fall within the range of 500 to 1,000,000, more usually in the range of 1000 to 100,000. It is preferred that the base polymer be water-soluble before glyoxalation. For the most part, base polyacrylamide polymers having a molecular weight of less than about 25,000 and especially less than 10,000 are normally preferred. The molecular weight of the base polyacrylamide is influenced by changing the reaction temperature, the level of solids in the reaction, changing the amount of initiator, changing the amount of chain transfer agent, and other methods used by those skilled in the art.

Glyoxalation

The so-prepared polyacrylamide polymer then is glyoxalated at an alkaline pH in the range of 7.2 to 10.0. The pH can be controlled using a buffer system. A buffer of mono- and di-sodium phosphate is suitable, though other buffers would include any material that simultaneously functions as both a weak acid and a weak base, and is able to maintain the desired pH such as: monopotassium phosphate plus borax, sodium hydroxide plus a mixture of acetic, phosphoric and boric acids, disodium phosphate plus citric acid.

Glyoxal (CHOCHO) reacts with pendant amide groups on the polyacrylamide backbone (1) according to the following reaction to produce a polyacrylamide having a pendant glyoxalated group (2):

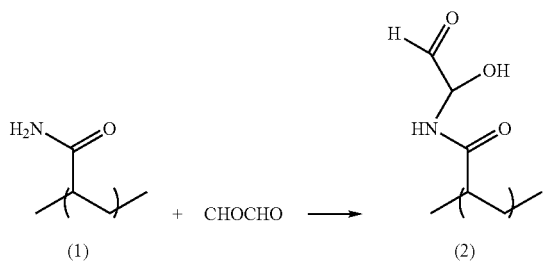

A second reaction involves the so-formed aldehyde moiety on the polymer backbone with another amide group, such as belonging to another macromolecule, and leads to building molecular weight and cross-linking.

To initiate the glyoxalation of the polyacrylamide, an amount of glyoxal to provide between about 10 to 60 mole percent glyoxal, based on the molar concentration of pendant amide groups and other optional glyoxal-reactive functional groups in the polyacrylamide, is added as the first of at least two separate portions to the polyacrylamide. Stated in another way, 1 to 6 glyoxals are supplied for every 10 pendant amide groups and other optional glyoxal-reactive functional groups in the polyacrylamide.

The glyoxalation of the cationic polyacrylamide usually is performed at a temperature of about 15° C. to about 50° C. and in an aqueous solution at a total solids concentration ranging from about 8 weight % to about 30 weight %.

The first portion of glyoxal is added to the polyacrylamide polymer in water to cause glyoxalation and some cross-linking between pendant amide and other glyoxal-reactive functional groups in the glyoxalated polyacrylamide. Such cross-linking increases the molecular weight of the composition. The molecular weight is preferably increased sufficiently so as to obtain a desired viscosity in the range of about 30 to about 80 cPs at 25° C. for a 20 weight % solids solution. Those skilled in the art will appreciate a suitable extent of crosslinking to obtain such a result.

Acid Quenching

As a desired viscosity is attained, the rate of the glyoxalation reactions and related cross-linking reactions can be slowed and eventually substantially terminated by acid quenching.

For better control of the glyoxalation reactions, a two step quenching procedure can be used. For example, the glyoxalation can start at a pH at the higher end of the pH range suitable for the glyoxalation reaction in order to obtain a higher reaction rate. In order to control the reaction rate, at a certain extent of conversion short of the desired end-point, the pH then is reduced by adding an acid to the reaction mixture (first acid quench to $7.0 \leqq pH \leqq 7.4$). The reaction then continues at a reduced rate. After a final desired viscosity is reached, a second acid quench is used to reduce the pH further ($3 \leqq pH \leqq 3.5$) and to substantially terminate the glyoxalation reactions.

It is preferred that the pH of the aqueous reaction system be adjusted to the range of 3 to 5 through addition of an acid. The acid added to the glyoxalated polyacrylamide can be either a mineral acid (such as hydrochloric acid, sulfuric acid, phosphoric acid and the like) or an organic acid like formic acid, acetic acid, citric acid, malic acid, lactic acid and the like.

A procedure for determining the amount of bound glyoxal in the glyoxalated polymer is described in Biochemistry, Vol. 81, pp. 47–56 (1977), which is incorporated by reference herein. Additional details on suitable reaction conditions for binding glyoxal to the primary vinylamide also are described in U.S. Pat. No. 3,556,932, which is also incorporated by reference.

Glyoxal Post-Addition

Following the acid quench, an optional second portion of glyoxal is then preferably added to the composition to enhance its stability. The amount of glyoxal added in the second portion is about 1% to about 75% by weight of the first portion of glyoxal, more usually between about 4 and about 50 weight percent. By increasing the amount of free-glyoxal in the composition at this point, an equilibrium is established that reduces the tendency of the composition to undergo further cross-linking before use, e.g., on shipping and storage. The glyoxalated polyacrylamide composition thus exhibits an improved stability because of the glyoxal post-addition.

The stability enhancement produced by the two-step glyoxal addition cannot be obtained simply by adding a higher amount of glyoxal in the first portion. The kinetics of the glyoxalation reactions, in the presence of a higher initial amount of glyoxal, precludes the obtainment of a proper balance between molecular weight (extent of cross-linking) and residual free glyoxal that results in the higher level of stability observed for the present composition.

Buffers

Further stability enhancement of the polyacrylamide composition is obtained by adding to the glyoxalated polyacrylamide composition a buffer that regulates (stabilizes) the pH of the glyoxalated polyacrylamide composition between about 3 and 3.5. One suitable buffer is a mixture of 20 parts by volume of a 0.2 M sodium hydroxide with 100 parts by volume of a stock solution containing 0.4 M acetic acid, 0.4 M phosphoric acid, and 0.4 M boric acid. This buffer is used in the following examples and has been shown to keep the pH of the glyoxalated polyacrylamide composition relatively constant over a period of at least six weeks.

Other buffers that could be used include materials that simultaneously function as both a weak acid and a weak base, such as citric acid with sodium citrate, disodium phosphate with citric acid, succinic acid with borax, acetic acid with sodium acetate, monopotassium phthalate with hydrochloric acid, bicarbonates, carbonate esters, complex carbonate salts of organic acids, hydrogen phosphates, phosphate esters, phosphinate esters, borates, borate esters, hydrogen sulfates, sulfinates, and sulfate esters.

Other examples of suitable buffers include potassium bicarbonate, potassium biphthalate, potassium bisulfate, potassium dihydrogen citrate, dipotassium hydrogen citrate, potassium dihydrogen phosphate, dipotassium hydrogen phosphate, potassium hydrogen tartrate, potassium hydrogen oxalate, potassium hydrogen maleate, potassium hydrogen succinate, potassium hydrogen glutarate, potassium hydrogen adipate, potassium tetraborate, potassium pentaborate, potassium octaborate and all the corresponding sodium salts, complex calcium carbonate salts of organic acids (such as octanoic acid, iso-octanoic acid, 2-ethyl hexanoic acid, hexanoic acid, and the like) and other similar materials known in the art.

Addition of Aldehyde Scavengers

One or more aldehyde scavengers of the invention can be added to a glyoxalated polyacrylamide composition and/or during one or more steps in the preparation of a glyoxalated polyacrylamide composition, including during polymerization of the base polyacrylamide, as long as the pH of the scavenger solution is adjusted before its addition to match the pH of the solution to which it is added. As described below, the amount of aldehyde scavenger added to any particular solution varies depending on the stage at which the scavenger is added. The longer storage life of the resultant stabilized product allows the glyoxalated polyacrylamide composition to be stored at a higher concentration (no dilution is required), and the only dilution that needs to be taken into account is at the wet end of the paper process. Thus, shipping and storage costs associated with compositions stabilized according to the present invention are generally lower than with prior art compositions.

During Polymerization of the Base Polyacrylamide

Not all acrylamide monomers form an adduct between the choline or choline salt during preparation of an aldehyde scavenger. Unless further purified, a preparation of aldehyde scavenger will contain free acrylamide monomers. If such a preparation is present during polymerization a base polyacrylamide, the free aldehyde monomers will be incorporated into the base polyacrylamide, and the aldehyde scavenger will already be present when glyoxalation of the base polyacrylamide begins; presence of the aldehyde scavenger at that point can increase the density of positive charges on the glyoxalated polyacrylamide, as described below.

If added during polymerization of a base polyacrylamide, the aldehyde scavenger preferably is present in an amount ranging from about 0.7 to about 1.5 mole percent based upon total acrylamide monomer.

Addition During and at the Beginning of Glyoxalation

Some wet strength arises from cationic charges binding with anionic sites on cellulose. If this binding is disrupted, the polymer chain will be free and unable to impart wet strength to paper. Adding one or more aldehyde scavengers of the invention at the beginning of glyoxalation increases the number of cationic charges on the polyacrylamide backbone, thereby increasing the ability of the glyoxalated polyacrylamide to impart wet strength to paper.

During glyoxalation, free (un-reacted) glyoxal is in equilibrium with glyoxalated pendant amide groups on the base polyacrylamide. If an aldehyde scavenger of the invention is present, free aldehyde scavenger is in equilibrium with adducts between the scavenger and pendant amide groups on the base polyacrylamide. The free aldehyde scavenger slows down the reaction between un-glyoxalated pendant amide groups and free glyoxal. These embodiments of the invention provides a copolymer with cationic charges as pendant groups which are bonded to the backbone through breakable bonds. Thus, a glyoxalated polyacrylamide composition having a higher positive charge density is obtained than if the aldehyde scavenger had not been present. Such compositions have a greater affinity for cellulose fibers than compositions prepared using other, non-charged scavengers.

Because the aldehyde scavenger provides cationic charges to the glyoxalated polyacrylamide in these embodiments, the base polyacrylamide need not be polymerized with cationic co-monomers. Thus, the base polyacrylamide can be a polyacrylamide homopolymer or can be a copolymer with a cationic co-monomer but at a lower concentration of cationic co-monomer than described in paragraph [17] above.

If added at the beginning of glyoxalation, the aldehyde scavenger preferably is present in an amount ranging from about 0.7 to about 1.5 mole for each mole of glyoxal.

If desired, one or more aldehyde scavengers of the invention can be included at any point during glyoxalation (i.e., before the acid quench). The resultant glyoxalated product has a longer shelf life. In addition, glyoxalation of the polyacrylamide is slower in the presence of the acid scavenger; thus, the endpoint of the glyoxalation reaction can be better controlled.

If added during the glyoxalation reaction, the aldehyde scavenger preferably is present in an amount ranging from about 0.1 to about 0.5 mole for each mole of glyoxal.

Addition after Glyoxalation

An aldehyde scavenger of the invention can be added after initial glyoxalation (i.e., during or after the acid quench). Addition of an aldehyde scavenger after glyoxalation also results in a longer shelf life for the final stabilized glyoxalated polyacrylamide composition.

If added during the acid quench, the aldehyde scavenger preferably is present in an amount ranging from about 0.01 to about 0.15 mole for each mole of glyoxal.

If added after the acid quench, the aldehyde scavenger preferably is present in an amount ranging from about 0.01 to about 0.3 mole for each mole of glyoxal.

Addition to Glyoxalated Polyacrylamide Compositions (e.g., "Post-Glyoxal Addition")

The pH tends to remain constant and the shelf-life of the composition tends to be increased further in the presence of aldehyde scavengers of the invention. Aldehyde scavengers of the invention thus provide enhanced stability to glyoxalated polyacrylamide compositions compared with known aldehyde scavengers. The glyoxalated polyacrylamide compositions can be prepared as described above or by any other means of preparing glyoxalated polyacrylamides known in the art.

As described above, stabilized glyoxalated polyacrylamides can be prepared by adding a second portion of glyoxal after the acid quench. Aldehyde scavengers of the invention also provide enhanced stability to these stabilized glyoxalated polyacrylamides. For example, the shelf life for a stabilized glyoxalated polyacrylamide prepared as described above but without any scavenger is about 20 days at room temperature. When a known aldehyde scavenger was added after glyoxal post-addition, the shelf life increased to about 40 days at room temperature. When an aldehyde scavenger of the invention (ethanaminium, 2-(3-amino-3-oxopropyl)-N,N,N-trimethyl-, chloride) was added after glyoxal post-addition, the glyoxalated polyacrylamide increased to about 60 days at room temperature. Using this scavenger, significant improvements in both initial wet strength and decay rate were obtained.

If added to a glyoxalated polyacrylamide composition, the aldehyde scavenger preferably is present in an amount ranging from about 0.01 to about 0.3 mole for each mole of glyoxal.

Manufacture of Paper

The compositions of glyoxalated polyacrylamide polymers stabilized according to the present invention are readily employed in the manufacture of paper as an aqueous solution. Generally, the composition used as a paper strengthening agent will have a solids concentration between about 5 and 30 weight percent. The composition is not limited to treating any particular type of paper and should find application in Kraft paper, sulfite paper, semichemical paper, and the like, including paper produced using both bleached and unbleached pulps.

When using a composition stabilized as described above in papermaking, it can be added at any time before, during or after the paper is formed. The composition is conveniently added at the wet end of a paper-making facility to the dilute cellulose fiber suspensions, normally at a point when wet strength resins are conventionally added. Alternatively, the composition also can be added to a previously prepared paper by padding, spraying, immersing, printing and the like.

The composition can be added to paper pulp over a wide range of pH values. However, best results should be obtained by adding the composition to the paper pulp at a pH of from about 5 to about 8, most preferably from about 5.5 to about 7.0. Compositions described above are readily absorbed by the cellulose fibers at these pH values.

The amount of added polymer can be as low as about 0.03% of the dry weight of the cellulose fibers, but usually does not exceed about 10% by weight. An amount in the range of 0.1% to 4% of the dry paper weight is more usual.

No heat curing is required with the composition described above because the resulting glyoxalated polyacrylamides develop their optimum strength on normal drying of the paper. Thus, polymer compositions described above develop their own strength both at room temperature and at temperatures at which paper is normally dried (190° F. to 350° F.; 88° C. to 176° C.).

All patents, patent applications, and references cited in this disclosure are expressly incorporated herein by reference. The above disclosure generally describes the present invention. A more complete understanding can be obtained by reference to the following specific examples, which are provided for purposes of illustration only and are not intended to limit the scope of the invention.

EXAMPLE 1

Base Polymer Synthesis

A suitable 2 liter glass reactor was fitted with a stirring apparatus, thermometer, a nitrogen inlet, a condenser and then placed in a heating bath. The reactor was charged with 370 g of water, 190 g of a base acrylamide solution (50% concentration), 0.9 g of N,N'-methylene bisacrylamide, 11 g of 2-mercaptoethanol and 123 g of a DADMAC solution (63% concentration). The reactor was then heated to 80° C. at which time an additional monomer feed and the initiator solution feed were continuously and slowly added to the reactor over 145 minutes and 160 minutes respectively. The monomer feed consists of a mixture of 850 g of a base acrylamide solution (50% concentration), 4.1 g of N,N'-methylene bisacrylamide and 49 g of 2-mercaptoethanol. The initiator feed consists of a mixture of 3.2 g of ammonium persulfate and 150 g of water. After the addition of the two feed streams was completed, the temperature was maintained at 80° C. for an additional 30 minutes. To lower the un-reacted base acrylamide concentration t-butyl hydroperoxide (0.7 g of a 70% aqueous solution and sodium formaldehyde sulfoxylate (0.3 g) were added. The final solution has a solids concentration of 41%, a pH of 3.3 and a viscosity of 25 cPs at 25° C.

EXAMPLE 2

Base Polymer Synthesis

The same procedure as in Example 1 was used, except the reactor was charged initially with 220 g of water, 196 g of an acrylamide solution (50% concentration), 4 g of 2-mercaptoethanol and 120 g of a DADMAC solution (63% concentration). The reactor was then heated to 80° C. at which time the monomer feed and the initiator solution feed were continuously and slowly added to the reactor over 145 minutes and 160 minutes respectively. In this case, the monomer feed consists of a mixture of 800 g of an acrylamide solution (50% concentration) and 16 g of 2-mercaptoethanol. The initiator feed consists of a mixture of 5.0 g of ammonium persulfate and 150 g water. The final solution has a solids concentration of 44%, a pH of 3.2 and a viscosity of 175 cPs at 25° C.

EXAMPLE 3

Base Polymer Synthesis

The same procedure as in Example 1 and 2 was used. The reactor was charged initially with 370 g of water, 190 g of a base acrylamide solution (50% concentration), 0.9 g of N,N'-methylene bisacrylamide, and 11 g of 2-mercaptoethanol. The reactor was then heated to 80° C. at which time the monomer feed and the initiator solution feed were continuously and slowly added to the reactor over 145 minutes and 160 minutes respectively. The monomer feed consists of a mixture of 850 g of an acrylamide solution (50% concentration), 4.1 g of N,N'-methylene bisacrylamide and 49 g of 2-mercaptoethanol. The initiator feed consists of a mixture of 3.2 g of ammonium persulfate and 150 g of water. After the 60-minute addition time, 123 g of a DADMAC solution (63% concentration) was quickly charged in one shot. After the monomer and initiator additions were completed, the temperature was maintained at 80° C. for an additional 30 minutes. To lower the un-reacted acrylamide concentration, t-butyl hydroperoxide (0.7 g of a 70% aqueous solution and sodium formaldehyde sulfoxylate (0.3 g) were added. The final solution has a solids concentration of 41%, a pH of 3.5 and a viscosity of 30 cPs at 25° C.

EXAMPLE 4

Polyacrylamide Glyoxalation

A suitable 4 liter glass reactor (with condenser) was fitted with a jacketed beaker connected to a circulated, constant temperature water bath. In the reactor, 1459 g of the base polymer (41% solids, obtained according to Example 1) was dissolved easily in 1077 g of water, followed by the addition of 354 g of a 40% weight glyoxal solution. The reactor was then heated to 30° C. The solution was adjusted to pH 8 by addition of 1N sodium hydroxide, as required. There was then added an aqueous sodium phosphate buffer (pH of 8.0) 333 g of an 8.85% concentration. The temperature was maintained at 30° C. for the entire reaction. The pH of the solution was maintained at 8.0 by appropriately adding 0.1N sodium hydroxide continuously. As soon as the Brookfield viscosity of the reaction solution reached 12 cPs, the addition of sodium hydroxide was stopped and the pH was lowered to 7.2 by adding 4.78 g of an aqueous 35% weight sulfuric acid solution. The pH of the reaction solution consequentially stayed in the range of from 7.2 to 7.1 to keep the reaction progressing at a moderate rate. When the polymer reaction solution reached a Brookfield viscosity of 54 cPs, the pH of the reaction solution was adjusted to a pH of 3.5 with the addition of 25.7 g of a 35% weight aqueous sulfuric acid solution to quench the reaction. Then, there was added a boric acid-based acidic buffer (pH of 3.3) in an amount of 68 g (8.65% aqueous concentration). To the resulting polymer was post-added an additional 15 g of a 40% glyoxal aqueous solution and 201 g of a 25% weight citric acid aqueous solution. The pH of the final glyoxalated polymer solution was adjusted to 3.3 by the addition of 1N sodium hydroxide and the solids concentration was adjusted to 20% with dilution water. The final resin is cationic and water soluble, has a solids concentration of 20 wt. %, has a cationic charge density of about 0.24 meq/gm, a pH of 3.3 and a viscosity of 22.5 cPs at 25° C.

EXAMPLE 5

Polyacrylamide Glyoxalation

The same procedure as in Example 4 was used, except the reactor was charged with 295 g of a 40% weight glyoxal aqueous solution, and to the acid-quenched polymer was post-added 74 g of a 40% weight glyoxal aqueous solution. The final resin has a solids concentration of 20 wt. %, a cationic charge density of about 0.23 meq/gm, a pH of 3.3 and a viscosity of 23.8 cPs at 25° C.

EXAMPLE 6

Polyacrylamide Glyoxalation

A suitable 1 liter glass reactor (with condenser) was fitted with a jacketed beaker connected to a circulated constant temperature water bath. In the reactor, 210 g of the base polymer (44% solids, obtained according to Example 2) dissolved easily in 144 g of water, followed by the addition of 23.5 g of a 40% weight glyoxal aqueous solution. The reactor was then heated to 30° C. The reaction solution was adjusted to a pH of 8 by the addition of 1N sodium hydroxide, as required. There was then added a sodium phosphate buffer (pH of 8) in the amount of 63.1 g of a 7.45% concentration aqueous solution. The temperature was maintained at 30° C. for the entire reaction. The pH of the solution was maintained at 8 by continuously adding 0.1N sodium hydroxide as necessary. As soon as the Brookfield viscosity of the reaction solution reached 15 cPs, the addition of sodium hydroxide was stopped and the pH was lowered to 7.2 by adding 0.9 g of a 35% weight sulfuric acid aqueous solution. The pH of the reaction solution consequentially stayed in the range of from 7.2 to 7.1 to keep the reaction progressing at a moderate rate. When the polymer reaction solution reached a Brookfield viscosity of 55 cPs, the pH of the reaction solution was lowered to a pH of 3.5 with 6.06 g of a 35% weight sulfuric acid aqueous solution to quench the reaction. There was then added a boric acid based acidic buffer (pH of 3.3) in an amount of 10.9 g of an 8.65% concentration aqueous solution. To the resulting polymer were post-added 11.7 g of a 40% glyoxal aqueous solution and 20 g of a 25% weight citric acid aqueous solution. The pH of the resulting glyoxalated polymer was finally adjusted to 3.3 by the addition of 1N sodium hydroxide and the solids concentration was adjusted to 20% with dilution water. The final resin is cationic and water-soluble, has a solids concentration of 20 wt. %, a cationic charge density of 0.43 meq/gm, a pH of 3.3 and a viscosity of 26.5 cPs at 25° C.

EXAMPLE 7

Procedure for Evaluation of Temporary Wet Strength Resins
Preparation of Handsheets The pulp stock used in the handsheet work was unrefined, and comprised a blend of 60% hardwood bleached Kraft pulp and 40% softwood bleached Kraft pulp. The stock freeness was in a range of 650 to 680 CSF. The stock pH was 6.8 throughout the process. The temporary wet strength resin (glyoxalated polyacrylamide) was added in an amount of 5 lb/ton of pulp solids to a 1% consistency diluted stock allowing a 2-minute mixing time (1000 rpm of mixing speed). The treated stock was immediately poured into the headbox of the Noble & Wood handsheet machine containing pH pre-adjusted water (pH of 6.8). The standard operating procedure for the Noble & Wood handsheet machine was carried out for each set of handsheets. The target sheet basis weight was 28 lb/3000 ft². Each wet sheet was given two passes through the full load wet press and then placed on the 105° C. drum dryer without the blotter for 1 minute. All sets of handsheets were further cured for 3 minutes at 105° C. in a forced air oven. The handsheet samples were conditioned at a constant humidity (50%) and at a constant temperature (73° F.) (23° C.) for 24 hours prior to testing. Dry tensile, Finch cup wet tensile in 5 seconds and 5 minutes of soaking time were tested to measure improved tissue temporary wet strength performance.

Dry Tensile Measurement

Each handsheet was trimmed to the size of 11"×11" and weighed to get the basis weight of each sheet. Ten strips (1 inch wide) per sheet were cut on the Thwing-Albert J.D.C. precision sample cutter. The standard operating procedure for the Thwing-Albert tensile tester then was carried out for each strip. The following calculation was done to obtain the dry tensile breaking length, Km (refer to TAPPI Test Method T494 om-88):

Dry Breaking Length=102,000*(T/R)

Where T=tensile strength (the average breaking force by the specimen width), kN/m and R=basis weight, g/m²

Wet Tensile Measurement

Again, the sheet was trimmed and weighed. Ten strips were prepared on the J.D.C. cutter. Each 1 inch-wide strip was placed in the Finch Cup Tester clamped in the Thwing-Albert tensile tester. The test sample was pulled after the desired soaking time (5 seconds and 5 minutes) using the Finch Cup. The wet breaking length calculations are the same as the dry breaking length calculation listed above. Each handsheet's wet and dry tensile ratio and wet strength decay rate after 5-minutes soaking time were calculated using the following formulae:

$$W/D(\%) = WT_{(5\ seconds)}/DT \times 100$$

$$\text{5-Min. Decay Rate}(\%) = [1 - WT_{(5\ Min.)}/WT_{(5\ seconds)}] \times 100$$

where
DT=dry breaking length
$WT_{(5\ seconds)}$=5-seconds Finch cup breaking length
$WT_{(5\ minutes)}$=5-minutes Finch cup breaking length The two resins (Example 4 and Example 5) were compared with Bayer PAREZ® 745 resin with the results as reported in the following Table:

TABLE 1

| | Handsheet Strength Results | | |
|---|---|---|---|
| Sample | Resin Stability Time to gel at 35° C. (Days) | W/D Tensile Ratio | % Functional Wet Strength Lost in 5 Minutes |
| Bayer PAREZ ® 745* | 14 | 13.5 | 46 |
| Example 4 | 33 | 18.1 | 56 |
| Example 5 | 40 | 16.2 | 50 |

EXAMPLE 8

Procedure for Evaluation of Dry Strength Resins

The pulp stock used in the handsheet work was 100% OCC furnish from a linerboard paper mill. The stock freeness was in a range of 550 to 530 CSF. The stock pH was pre-adjusted to 7.5 by using 1N sodium hydroxide before the addition of the additives. The dry strength resin was added to a 3% consistency thick stock allowing a 2-minute mixing time (1000 rpm of mixing speed). The thick stock was immediately diluted to 1% consistency and there was then added 2 lb/ton of an AKD size (NovaSize 3016) with 10 lb/ton of a cationic wet end starch (STA-LOK® 360) to simulate the OCC linerboard paper machine wet end chemistry condition. The stock was mixed for 2 minutes and poured into the headbox of the Noble & Wood handsheet machine containing water pre-adjusted to a pH of 7.5. The papermaking pH was controlled in a range of 7.5 to 8. The standard operating procedure for the Noble & Wood handsheet machine was carried out for each set of handsheets. The target sheet basis weight was 42 lb/1000 ft². Each wet sheet was given two passes through the full load wet press and then placed on the 105° C. drum dryer without the blotter for 5 minutes. All sets of handsheets were cured for 3 minutes at 105° C. in a forced air oven. The handsheet samples were conditioned for 24 hours using the same conditions as in Example 7 prior to testing. Dry tensile and Scott plybond were tested to measure improved dry strength performance.

Dry Tensile Strength

The same procedure as reported in Example 7 was used.

Scott Bond

The internal Scott Bond is a test that measures the energy required to rapidly delaminate a sheet-type specimen (refer to TAPPI Provisional Method T569 pm-00).

The paper dry strength performance of the resin (Example 6) was shown by an alkaline linerboard OCC handsheet study with 10% dry tensile, 39% internal Scott bond gains over the waterleaf handsheet condition. Example 6 was tested and was shown to have an equivalent dry tensile strength and internal Scott bond to PAREZ® 631 and HERCOBOND® 1000. But, the resin of the present invention was seen to have a significant improvement in resin solids, cationic charge and resin stability over the two competition products as presented below:

TABLE 2

| Sample | Resin Stability Time to gel at 35° C. (Days) | Resin Solids, % | Cationic Charge, meq/gram |
|---|---|---|---|
| Parez 631 (Bayer) | 4 | 10 | 0.25 |
| Hercobond 1000 | 9 | 8 | 0.34 |
| Example 6 | 20 | 20 | 0.43 |

The accelerated stability tests were conducted at 35° C. Experience indicates that a composition will exhibit a shelf life of two to three times the period it takes the composition to gel at 35° C.

As these data show, by employing the method of the present invention for modifying the glyoxalated polyacrylamide composition, a composition of equivalent paper strengthening quality, as compared with the prior art, is obtained; while providing a composition of significantly improved stability and other properties.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

While the invention has been described in conjunction with specific embodiments thereof, the foregoing description and examples are intended to illustrate, but not limit the scope of the invention. Other aspects, advantages and modifications will be apparent to those skilled in the art to which the invention pertains. These aspects and modifications are within the scope of the invention, which is limited only by the appended claims.

What is claimed is:

1. A glyoxalated polyacrylamide composition of improved stability comprising a glyoxalated polyacrylamide and an aldehyde scavenger having the structure:

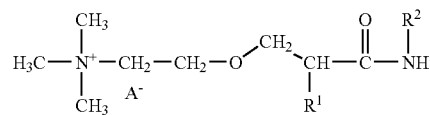

wherein:

$R^1$ is hydrogen or $C_1$–$C_2$ alkyl;
$R^2$ is hydrogen or $C_1$–$C_4$ alkyl; and
$A^-$ is a compatible anion.

2. Paper strengthened with the glyoxalated polyacrylamide composition of claim 1.

3. The glyoxalated polyacrylamide composition of claim 1 wherein $R^1$ and $R^2$ are each hydrogen and $A^-$ is chloride.

* * * * *

UNITED STATES PATENT AND TRADEMARK OFFICE
CERTIFICATE OF CORRECTION

| | |
|---|---|
| PATENT NO. | : 7,034,087 B2 |
| APPLICATION NO. | : 10/919487 |
| DATED | : April 25, 2006 |
| INVENTOR(S) | : Cornel Hagiopol et al. |

Page 1 of 1

It is certified that error appears in the above-identified patent and that said Letters Patent is hereby corrected as shown below:

Column 1, Line 63, "$C_{1-2}$" should be --$C_1$-$C_2$--

Signed and Sealed this

Twenty-sixth Day of December, 2006

JON W. DUDAS
*Director of the United States Patent and Trademark Office*